Jan. 7, 1964   R. L. JEPSEN ETAL   3,116,764
HIGH VACUUM METHOD AND APPARATUS
Filed March 30, 1959
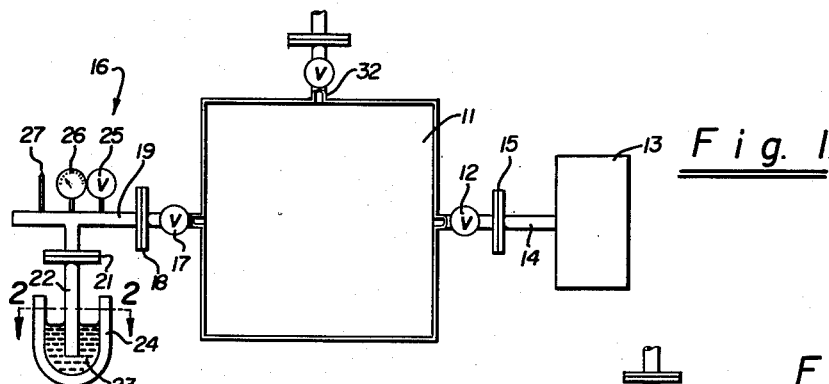
Fig. 1
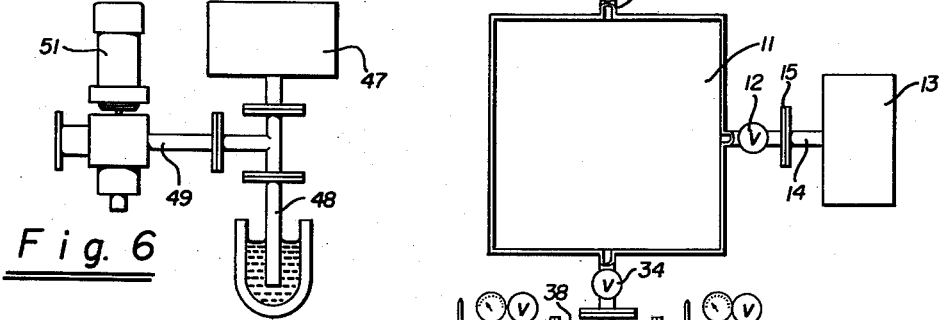
Fig. 4
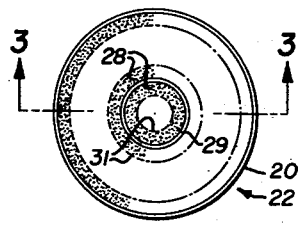
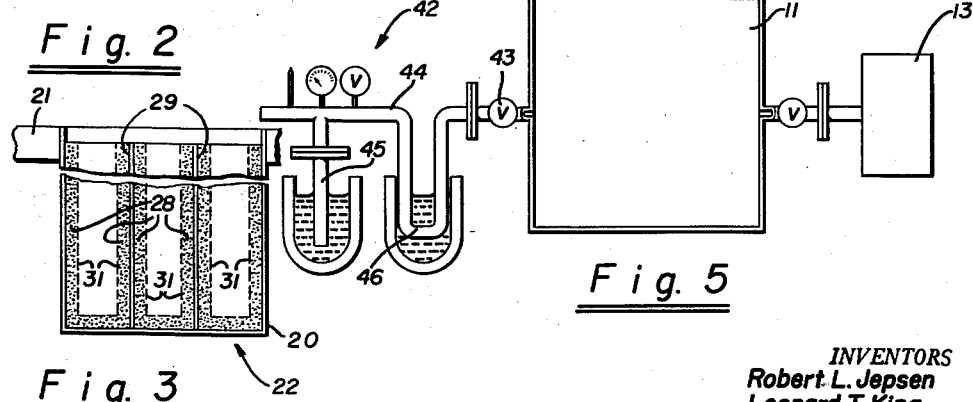
Fig. 6
Fig. 2
Fig. 3
Fig. 5
INVENTORS
Robert L. Jepsen
Leonard T. King
BY Rene M. Rogers
Paul B. Hunter
Attorney United States Patent Office 3,116,764
Patented Jan. 7, 1964

3,116,764
HIGH VACUUM METHOD AND APPARATUS
Robert L. Jepsen, Santa Clara, Leonard T. King, San Mateo, and Rene M. Rogers, Santa Clara, Calif., assignors to Varian Associates, Palo Alto, Calif., a corporation of California
Filed Mar. 30, 1959, Ser. No. 802,731
12 Claims. (Cl. 141—8)

This invention relates in general to a novel method and means for producing uncontaminated vacuums having extremely low pressures as required in many devices such as, for example, vacuum tubes, high energy particle accelerators, mass spectrometers, "space" chambers, fusion apparatus, electron microscopes, ammonia masers and the like.

Heretofore certain difficulties have been encountered in using electrical vacuum pumps or ion pumps, as they are sometimes referred to, to achieve extremely low pressures. A typical electrical vacuum pump is sold under the trademark "VacIon" by Varian Associates. Such an electrical getter-ion vacuum pump hereinafter referred to as an electrical vacuum pump can achieve extremely low pressures such as, for example, $1 \times 10^{-9}$ mm. of Hg, but electrical vacuum pumps of this type do not operate efficiently until a pressure at least as low as the range of $1 \times 10^{-1}$ to $1 \times 10^{-2}$ mm. of Hg has been attained. In the past these electrical vacuum pumps have been operated in combination with mechanical pumps which create the low pressure necessary before the electrical vacuum pump can be operated efficiently. However, these mechanical forepumps often contaminate the structure being evacuated with oil and contribute noise, vibration and additional cost to the pumping system.

One possible way of avoiding the undesirable features of mechanical forepumps would be to refrigerate a portion of the structure being evacuated to freeze or condense gas particles in order to reduce the pressure within the structure to a pressure range at which an electrical vacuum pump can operate efficiently. However, mere refrigeration of a portion of the structure being evacuated is not very efficient since very low temperatures must be achieved before the pressure within the structure being evacuated is sufficiently reduced so that an electrical vacuum pump can be started. For example, the pressure of a closed structure can be reduced from atmospheric pressure to a few microns by chilling an appendage or other portion of the system with liquid helium ($\sim 4°$ K.). However, liquid helium is fairly expensive, is not a "household" item in many plants and laboratories and requires a fair amount of skill and apparatus to use it properly.

The object of the present invention is to provide a novel method and apparatus for obtaining uncontaminated vacuums having extremely low pressures quickly and efficiently.

One feature of the present invention is the provision of a novel method of and means for obtaining a high vacuum by utilization of highly adsorbent materials as, for example, refrigerated activated charcoal or the like in combination with an electrical vacuum pump.

Another feature of the present invention is the provision of a novel method of and means for obtaining a high vacuum by utilization of highly adsorbent materials as, for example, refrigerated activated charcoal or the like in combination with an electrical vacuum pump for evacuating a system that has been flushed with a gas with relatively high condensation temperature in comparison with the temperature of the highly adsorbent material.

Still another feature of the present invention is the provision of a novel method of and means for creating a high vacuum utilizing highly adsorbent materials as, for example, refrigerated activated charcoal or the like in combination with an electrical high vacuum pump including the step of and means for first condensing gases of relatively high condensation temperatures in comparison with the temperature of the highly adsorbent material.

Activated charcoal (or similar materials such as silica gel or molecular sieves) has long been recognized for its adsorbent character for improving vacua. Many different reasons such as the large surface area, the porosity on the microscopic or ultramicroscopic scale and the porosity on the molecular scale have been advanced for explaining the unusually high adsorbent character of these materials. In the past such materials have been used in combination with roughing pumps and with conventional diffusion pumps for the purpose of improving vacua.

The present invention relates to the use of highly adsorbent materials as, for example, activated charcoal or like materials as the roughing pump itself rather than the use of such materials for the final stage of evacuating a system. The use of these highly adsorbent materials eliminates certain of the difficulties inherent in the use of mechanical pumps. In addition, the inherent cleanliness of the system enables the electrical vacuum pump to operate more efficiently and at higher pressures.

The above features and advantages of the present invention will be more apparent upon a perusal of the following specification taken in connection with the accompanying drawings wherein, FIG. 1 is a schematic view of one embodiment of the present invention, FIG. 2 is a cross section of the structure of FIG. 3 taken along line 2—2 in FIG. 1 in the direction of the arrows, FIG. 3 is an enlarged cross section of the structure shown in FIG. 2 taken along line 3—3 in the direction of the arrows, FIG. 4 is a schematic view of a further embodiment of the present invention, FIG. 5 is a schematic view of a further embodiment of the present invention, and FIG. 6 is a view of the features of the present invention as utilized for evacuating a vacuum tube.

Referring now to FIGS. 1–3 a structure 11 which is to be evacuated is connected through a valve 12 to a tube 14 by a flange 15 and then to an electrical vacuum pump 13. Structure 11 is also connected through a valve 17 to an appendage 16 by means of a flange 18. Appendage 16 comprises a tube 19 connected by a flange 21 to an appendage pump 22 defined by an evacuated envelope 20 and containing a highly adsorbent material as, for example, activated charcoal. To reduce the vacuum using the activated charcoal, appendage pump 22 is immersed in a refrigerating liquid 23 as, for example, nitrogen held in a Dewar flask 24. Attached to tube 19 are a pressure relief valve 25 for venting appendage 16 to atmosphere, a pressure gauge 26 and a safety valve 27 to prevent any extreme pressure build up in the system.

The charcoal can be placed in the appendage pump 22 in any suitable manner. For a combination of good gas access to the charcoal 28 and rapid transfer of heat from the charcoal to the envelope 20 and the liquid nitrogen 23, a scheme such as that shown in FIGS. 2 and 3 is utilized. A hollow cylindrical shell 29 is fixed inside of the bottom of cylindrical envelope 20 and both the inner and outer surfaces of this shell 29 and the inner surface of the longitudinally extending side wall and bottom of envelope 20 are bounded by, for example, a mesh grid 31 spaced from the surfaces whereby the charcoal 28 is held between the grids and the surfaces providing a large surface area of charcoal, the temperature of the charcoal being controlled by thermal conduction through the shell 29 and the longitudinally extending side wall and bottom of envelope 20.

The system is evacuated by first opening valves 12 and 17 whereby appendage 16 communicates with the structure 11 and the electrical vacuum pump 13. The refrigerated activated charcoal within appendage pump 22 adsorbs the gases within structure 11 and pump 13 until the pressure therein has been reduced to a pressure as, for example, between $1 \times 10^{-1}$ and $1 \times 10^{-3}$ mm. of Hg depending upon the details of the system. The valve 17 is then closed separating appendage 16 from structure 11 and pump 13, and the pump 13 is then started for reducing the pressure within structure 11 to, for example, approximately $1 \times 10^{-9}$ mm. of Hg.

In order that the activated charcoal portion of the pumping system will operate more efficiently, the structures 11, 13 and 16 can first be flushed with a readily condensible gas as, for example, carbon dioxide fed through a tube 32 into structure 11 to aid in removing from these structures gases with lower condensation temperatures than liquid nitrogen.

Referring now to FIG. 4 the efficiency of the activated charcoal portion of the pumping system can be improved by first freezing out water and carbon dioxide in a separate chamber of the appendage to the structure 11 to prevent the pores of the activated charcoal from becoming clogged with ice, frozen carbon dioxide or the like. In this embodiment of the present invention an appendage 33 communicates with structure 11 through a valve 34. This appendage 33 comprises a T tube 35 one branch 36 of which is connected to an appendage pump 37 and the other branch 39 of which includes a valve 38 and is connected to an appendage pump 41, appendage pump 41 being empty and appendage pump 37 containing charcoal similar to appendage pump 22 described above. First of all, with both appendage pumps 37 and 41 communicating with structure 11, appendage pump 41 is refrigerated as by being immersed in liquid nitrogen and thereby water and carbon dioxide are collected within appendage pump 41 which is thereafter separated from the system by closing valve 38. Following this the remaining gases can be condensed in charcoal filled appendage pump 37 by immersing it in liquid nitrogen. If the gases collected in appendage pump 41 are frozen it might not be necessary to separate appendage pump 41 off from the remainder of the pumping system while refrigerating chamber 37.

Referring now to FIG. 5 there is shown a further embodiment of the present invention wherein structure 11 is connected to an appendage 42 through a valve 43, said appendage 42 comprising a tube 44 and an appendage pump 45 containing highly adsorbent material. The tube 44 is provided with means as, for example, a U shaped bend 46 in the tube whereby a portion of the tube between appendage pump 45 and structure 11 can be refrigerated as by immersing the bend 46 in liquid nitrogen. In this manner water and carbon dioxide can be separated from the rest of the pumping system in the form of frozen material on the inside walls of the bend 46 still permitting the flow of other gases through the tube 44 to appendage pump 45 wherein they are adsorbed to reduce the pressure in the system to a level at which the electrical vacuum pump 13 can operate efficiently.

As a further embodiment of the present invention (see FIG. 6) an electrical vacuum pump 47 and an appendage pump 48 containing highly adsorbent material can both be connected by a common tube 49 to a structure to be evacuated as, for example, a klystron tube 51. The appendage pump 48 can be immersed in liquid nitrogen until the pressure within the klystron 51 is reduced to a level at which the electrical vacuum pump 47 can operate efficiently. Then appendage pump 48 can be pinched off and discarded and the vacuum within the klystron reduced by means of electrical vacuum pump 47 whereupon the electrical vacuum pump 47 and the tube 49 can then be pinched off.

In certain large systems it may become desirable for better pumping efficiency to employ some combination of roughing down with a water aspirator or a steam ejector with or without flushing with a readily condensible gas, before beginning the aforementioned steps of vacuum pumping.

Since many changes could be made in the above construction and many apparently widely different embodiments of this invention could be made without departing from the scope thereof it is intended that all matter contained in the above description or shown in the accompanying drawings shall be interpreted as illustrative and not in a limiting sense.

What is claimed is:

1. The method of creating a high vacuum within a structure initially at substantially atmospheric pressure by means of an electrical getter-ion vacuum pump and a refrigerated sorption appendage pump containing a highly sorbent material comprising the steps of first flushing said structure, said appendage pump, and said electrical vacuum pump with a flushing gas which has a condensation temperature above the temperature to which said appendage pump will be cooled, then evacuating said structure and said electrical vacuum pump by cooling said appendage pump at least to a temperature on the order of that of liquid nitrogen, then sealing said appendage pump off from said structure and said electrical vacuum pump, and finally evacuating said structure with said electrical vacuum pump.

2. The method of creating a high vacuum within a structure initially at substantially atmospheric pressure by means of an electrical getter-ion vacuum pump and an appendage pump, at least the portion of said appendage pump most remote from said structure containing a highly sorbent material comprising the steps of first evacuating said structure and said electrical vacuum pump by cooling said appendage pump at least to a temperature on the order of that of liquid nitrogen whereby condensable gases are condensed in portions of said appendage pump closest said structure and other gases are pumped in the portion containing the sorbent material, then sealing said appendage pump off from said structure and said electrical vacuum pump, and finally evacuating said structure with said electrical vacuum pump.

3. The method of creating a high vacuum within a structure initially at substantially atmospheric pressure by means of an electrical getter-ion vacuum pump and a plurality of appendage pumps, at least one of said appendage pumps containing a highly sorbent material comprising the steps of evacuating said structure, said electrical vacuum pump and the other appendage pumps communicating therewith by sequentially cooling and valving off each of said appendage pumps with at least the last of said appendage pumps containing sorbent material, and finally evacuating said structure with said electrical vacuum pump.

4. A vacuum pump apparatus comprising in combination a vacuum tight envelope adapted to be refrigerated, means for connecting said envelope to a system to be evacuated, a highly sorbent material positioned within said envelope for adsorption of the gas from the system being evacuated, said envelope including longitudinally extending conducting wall means in direct contact with said sorbent material therein, the area of said longitudinally extending conducting wall means of said pump in direct contact with sorbent material being greater than five times the greatest projected area of said envelope for conducting heat from said sorbent material whereby said sorbent material can be refrigerated and additional conduction means within said envelope for conducting heat from said sorbent material to said envelope whereby said sorbent material can be further refrigerated.

5. The vacuum pump apparatus of claim 4 wherein said additional conduction means includes at least one section of tubing positioned within said envelope and fixedly secured to said envelope, providing over its major portion direct contact with said sorbent material positioned within said envelope.

6. Apparatus for producing a high vacuum within a structure initially at substantially atmospheric pressure comprising in combination an electrical getter-ion vacuum pump communicating with said structure; a plurality of appendage pumps, at least one of said appendage pumps containing a highly sorbent material; means providing communication between each of said appendage pumps and said structure and said electrical vacuum pump; means for valving each of said appendage pumps off from said structure and said electrical vacuum pump, and means for refrigerating said appendage pumps whereby said appendage pumps can be refrigerated and valved off after the pressure within said structure and said electrical vacuum pump has been reduced to a level at which said vacuum pump operates efficiently.

7. Apparatus for producing a high vacuum within a structure initially at substantially atmospheric pressure comprising in combination an electrical getter-ion vacuum pump communicating with said structure; a plurality of appendage pumps at least one of which contains a highly sorbent material; means providing communication between each of said appendage pumps and said structure, said electrical vacuum pump and the other appendage pumps; means for refrigerating said appendage pumps and means for sequentially valving all of said appendage pumps off from said structure, said electrical vacuum pump and the remaining appendage pumps communicating therewith whereby when said appendage pumps are sequentially refrigerated and valved off the pressure within the structure, the electrical vacuum pump and the remaining appendage pumps communicating therewith can be progressively reduced so that the pressure within said structure and said electrical vacuum pump is at a level at which said vacuum pump operates efficiently when the last of said appendage pumps is valved off therefrom.

8. Apparatus for producing a high vacuum within a structure initially at substantially atmospheric pressure comprising in combination an electrical getter-ion vacuum pump communicating with said structure, an appendage pump communicating with said structure and said electrical vacuum pump and containing a highly sorbent material, said appendage pump adapted for sorption of gas initially in said structure, means for refrigerating said appendage pumps and means for sealing said appendage pump off from said structure and said electrical vacuum pump whereby said appendage pump can be refrigerated for sorption of gases therein to reduce the pressure within the said structure at a level at which said vacuum pump operates and then said electrical vacuum pump can evacuate said structure to a high vacuum.

9. A method of creating a high vacuum within a structure initially at substantially atmospheric pressure by means of an electrical getter-ion vacuum pump and a refrigerated sorption appendage pump containing a highly sorbent material comprising the steps of first evacuating said structure from substantially atmospheric pressure to a pressure at which said getter-ion pump operates by cooling said appendage pump to a temperature at least on the order of that of liquid nitrogen whereby sorption of the gas initially in said structure takes place in said sorption material, then sealing said appendage pump off from said structure, and finally evacuating said structure to a high vacuum with said electrical getter-ion vacuum pump.

10. A vacuum pump apparatus comprising in combination a vacuum tight envelope adapted to be refrigerated, means for connecting said envelope to a system to be evacuated, a highly sorbent material positioned within said envelope for sorption of the gas from the system being evacuated, said envelope including longitudinally extending conducting wall means in direct contact with said sorbent material therein, the area of said longitudinally extending conducting wall means of said pump in direct contact with sorbent material being greater than 5 times the greatest projected area of said envelope for conducting heat from said sorbent material whereby said sorbent material can be refrigerated, and gas pervious means within said envelope for confining said sorbent material against said envelope and defining gas access passageways for providing gas access to substantially all of said sorbent material.

11. A vacuum pump apparatus comprising in combination a vacuum tight envelope adapted to be refrigerated, means for connecting said envelope to a system to be evacuated, a highly sorbent material positioned within said envelope and in direct contact with said envelope, gas pervious means within said envelope confining said sorbent material against said envelope and defining gas access passageways for providing gas access to said sorbent material, and conduction means within said envelope for conducting heat from said sorbent material, said conduction means including at least one section of tubing positioned within said envelope and fixedly secured to said envelope, providing over its major portion direct contact with said sorbent material positioned within said envelope and said gas pervious means confining sorbent material against said conduction means.

12. Apparatus for producing a vacuum of an extremely low pressure within a structure initially at substantially atmospheric pressure comprising in combination an electrical getter-ion vacuum pump connected to and communicating with said structure, an appendage pump containing a highly adsorbent material connected to said structure and communicating with said structure and said electrical getter-ion vacuum pump, means for refrigerating said appendage pump whereby gases from said structure and said electrical getter-ion vacuum pump are adsorbed within said appendage pump thereby reducing the pressure within said structure and said electrical getter-ion vacuum pump from atmospheric pressure to a pressure at which said electrical getter-ion vacuum pump operates efficiently, and means positioned between said structure and said appendage pump for valving said appendage pump off from said structure.

References Cited in the file of this patent

UNITED STATES PATENTS

| 1,189,664 | Claude | July 4, 1916 |
| 1,789,556 | Machlett | Jan. 20, 1931 |
| 2,749,002 | Perry et al. | June 5, 1956 |